(12) United States Patent
Naidu et al.

(10) Patent No.: US 11,483,547 B2
(45) Date of Patent: Oct. 25, 2022

(54) SYSTEM AND METHOD FOR ADAPTIVE CORRECTION FACTOR SUBSAMPLING FOR GEOMETRIC CORRECTION IN AN IMAGE PROCESSING SYSTEM

(71) Applicant: NXP USA, INC., Austin, TX (US)

(72) Inventors: Sharath Subramanya Naidu, Munich (DE); Michael Andreas Staudenmaier, Munich (DE); Ajit Singh, Delhi (IN); Leonardo Surico, Haar (DE)

(73) Assignee: NXP USA, Inc., Austin, TX (US)

( * ) Notice: Subject to any disclaimer, the term of this patent is extended or adjusted under 35 U.S.C. 154(b) by 244 days.

(21) Appl. No.: 16/702,969

(22) Filed: Dec. 4, 2019

(65) Prior Publication Data

US 2021/0176455 A1     Jun. 10, 2021

(51) Int. Cl.
| | |
|---|---|
| *H04N 17/00* | (2006.01) |
| *H04N 5/232* | (2006.01) |
| *G06T 3/00* | (2006.01) |
| *G06T 7/80* | (2017.01) |
| *B60R 11/04* | (2006.01) |

(52) U.S. Cl.
CPC ........... *H04N 17/002* (2013.01); *B60R 11/04* (2013.01); *G06T 3/0012* (2013.01); *G06T 7/80* (2017.01); *H04N 5/23229* (2013.01); *B60R 2300/402* (2013.01); *G06T 2207/30252* (2013.01)

(58) Field of Classification Search
CPC .. H04N 5/23229; H04N 5/217; H04N 17/002; G06T 3/0093; G06T 5/006; G06T 7/80; G06T 3/0012; G06T 2207/20021; G06T 2207/30252; B60R 11/04; B60R 2300/402

See application file for complete search history.

(56) References Cited

U.S. PATENT DOCUMENTS

| | | | | |
|---|---|---|---|---|
| 4,876,726 | A * | 10/1989 | Capello | ..................... G06T 5/20 382/197 |
| 6,636,222 | B1 * | 10/2003 | Valmiki | ................... H04N 9/45 348/715 |
| 6,975,324 | B1 * | 12/2005 | Valmiki | ............. H04N 5/44504 348/568 |
| 8,055,070 | B2 | 11/2011 | Bassi et al. | |
| 8,326,077 | B2 | 12/2012 | Chai et al. | |
| 8,928,730 | B2 | 1/2015 | Stec et al. | |
| 9,154,788 | B2 * | 10/2015 | Wahadaniah | ........ H04N 19/176 |
| 9,508,132 | B2 | 11/2016 | Weber | |

(Continued)

FOREIGN PATENT DOCUMENTS

| | | | |
|---|---|---|---|
| EP | 1 650 705 B1 | 5/2013 | |
| EP | 1 959 676 B1 | 4/2017 | |

*Primary Examiner* — Zaihan Jiang (57) ABSTRACT

A camera system and method are disclosed. The camera includes a memory, a camera, and a processor. The memory stores an adaptively subsampled look-up table. The adaptively subsampled look-up includes varying levels of subsampling across the adaptively subsampled look-up table. The camera captures an image, and the captured image is distorted based on varying distortions within an optical system of the camera. The processor receives the captured image from the camera, corrects the distorted captured image based on the adaptively subsampled look-up table to create a correct image, provides the corrected image, and executes a safety feature based on the corrected image.

20 Claims, 8 Drawing Sheets

(56) References Cited

U.S. PATENT DOCUMENTS

| | | | |
|---|---|---|---|
| 9,536,287 B1 | 1/2017 | Eldar | |
| 9,633,419 B2 | 4/2017 | Baek et al. | |
| 2004/0064716 A1* | 4/2004 | Tapson | H04N 1/3217 |
| | | | 713/193 |
| 2004/0071213 A1* | 4/2004 | Tapson | H04N 1/32187 |
| | | | 375/240.19 |
| 2007/0120874 A1* | 5/2007 | MacInnis | G09G 5/12 |
| | | | 345/634 |
| 2008/0211937 A1* | 9/2008 | Steinberg | H04N 5/2354 |
| | | | 348/241 |
| 2012/0002113 A1* | 1/2012 | Nishio | H04N 9/04515 |
| | | | 348/E5.077 |
| 2012/0044369 A1* | 2/2012 | Irisawa | H04N 5/23287 |
| | | | 359/554 |
| 2012/0268655 A1* | 10/2012 | MacInnis | G06F 16/9577 |
| | | | 348/E5.077 |
| 2014/0160244 A1* | 6/2014 | Berberian | H04N 13/271 |
| | | | 348/46 |
| 2015/0063720 A1* | 3/2015 | Maltz | H04N 1/00997 |
| | | | 382/284 |
| 2016/0042548 A1* | 2/2016 | Du | G06T 13/40 |
| | | | 345/473 |
| 2016/0328591 A1* | 11/2016 | Santi | G06K 7/10732 |
| 2017/0169575 A1* | 6/2017 | Pérez Acal | G01B 11/16 |
| 2017/0223267 A1* | 8/2017 | Dabral | H04N 5/2353 |

\* cited by examiner

SYSTEM AND METHOD FOR ADAPTIVE CORRECTION FACTOR SUBSAMPLING FOR GEOMETRIC CORRECTION IN AN IMAGE PROCESSING SYSTEM

FIELD OF THE DISCLOSURE

The present disclosure relates generally to data conversion between an analog form and a digital form in an image processing system and more specifically relates to adaptive correction factor subsampling for geometric correction.

BACKGROUND OF THE DISCLOSURE

Optical systems for cameras, such as a camera based Advanced Driver Assistance System (ADAS) systems, typically introduce geometric distortion, which may cause significant issues because the same object may look different depending on the area of a camera sensor that the object is projected. In response to distortion within an image exceeding a particular value, prior systems may implement a remapping process to digitally correct the distortion introduced by the optical system. In certain examples, the remapping process may be implemented in a dedicated block of a processor, such as a system on a chip (SoC).

Direct remapping of geometric distortion correction may include looking for each pixel in a corrected image (e.g., a target pixel), looking where each pixel comes from (e.g., source position), and interpolating the surrounding source pixels accordingly. However, this direct remapping approach may include an access profile that is inefficient for certain types of memory because this approach requires reading each source pixel many times during the correction process, which in turn may vastly inflate the required bandwidth of the compute vision system.

A current approach to mitigate the amount of bandwidth utilized includes performing geometric distortion correction on a tile-by-tile basis in a destination image. In an example, a tile geometric distortion correction technique processes and performs distortion correction on an entire tile at one time. This distortion correction technique may allow the system to pre-fetch source data from an external memory so bandwidth utilization between a processor and the external memory may be significantly reduced. However, a high bandwidth utilization overhead may remain during the processing of the boundaries of the tiles, because there are usually pixels that still need to be re-fetched. Additionally, based on a non-linear distortion within the image, a size of the area that should be read to generate a destination tile is not constant.

While tile based geometric correction techniques are suited to perform distortion correction, these techniques have the drawback that these techniques require a significant amount of descriptor data to be read periodically during the correction step. In an example, the additional bandwidth of reading the significant amount of descriptor data comes on top of the bandwidth generated by reading the source pixels and writing back the corrected image. Thus, a geometric distortion correction technique that significantly reduces the size of the descriptor data without impacting the quality of the correction step would be a technological improvement over existing technology.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A calibration system, a camera system, and methods are disclosed. The calibration system includes a memory and a processor. The processor may receive multiple images captured by a camera of the camera system. In an example, each image may be a particular known pattern, such as a checkerboard, and the images may be different from one another but the pattern for each image is known. The processor may calibrate a mathematical model describing the distortion of the optical system within the camera system using sample points extracted out of the detected pattern in the scene captured by the camera system. In an example, the calibration of the mathematical model is based on the dimensions of the pattern in the image being known to the processor. Based on the mathematical model, the processor may generate a full look-up table. The processor may divide the full look-up table into a first plurality of patches, and each of the first plurality of patches may be the same size. The processor may subsample, at a first subsampling, the full look-up table at locations associated with the each of the first plurality of patches, and create a first portion of subsampled correction data within an adaptively subsampled look-up table based on the first subsampling. The processor may determine a maximum difference between the positions of pixels in the full look-up table and the positions of the pixels in the adaptively subsampled look-up table. The processor may compare the maximum difference to a threshold value, such as a maximum acceptable deviation of the positions of the pixels in the adaptively subsampled look-up table from the positions of the pixels in the full look-up table.

If the maximum difference is greater than a threshold value, the processor may continue to divide the first plurality of patches into n plurality of patches, and continue to determine the maximum difference between the positions of pixels in the full look-up table and the positions of the pixels in the adaptively subsampled look-up table until the maximum difference is less than the threshold value down to the level where a sub-patch only contains a single pixel. The processor may create an updated adaptively subsampled look-up table with each of the different subsampling for each patch of the full look-up table within corresponding portions of the adaptively subsampled look-up table.

Therefore, the calibration system disclosed herein to calibrate a camera system within a vehicle provides various advantages and benefits over other systems that correct geometric distortion introduced by optical systems of cameras. In particular, the adaptively subsampled look-up table may enable the processor to calibrate the camera system to correct geometric distortions with an image without reducing the quality of the image, and with a reduction in bandwidth needed to store a look-up table for the image correction.

A camera system and method are disclosed. The camera system includes a memory, a camera, and a processor. The memory stores an adaptively subsampled look-up table. The adaptively subsampled look-up includes different levels of subsampling across the adaptively subsampled look-up table. The camera captures an image, and the captured image is distorted based on distortions within an optical system of the camera. The processor receives the captured image from the camera, corrects the distorted captured image based on the adaptively subsampled look-up table to create a correct image, and provides the corrected image to other systems of an ADAS. In an example, one or more systems, such as safety systems, within vehicle may utilize relevant information from the corrected image to trigger actions by the systems. For example, the other systems in the ADAS system may utilize information from the corrected image to trigger automatic braking or steering controls. In certain examples, the vehicle system may include a display device, such as a rear camera display, and the display device may receive the corrected image from the processor, and display the corrected image.

While previous systems implementing geometric correction of images utilize the same subsampling across all portions of the image. However, the degree of geometric distortion is not constant over the image. Therefore, the systems disclosed herein reduce the bandwidth spent for reading the look-up table while keeping the distortion correction quality at an acceptable level.

Figure 1:
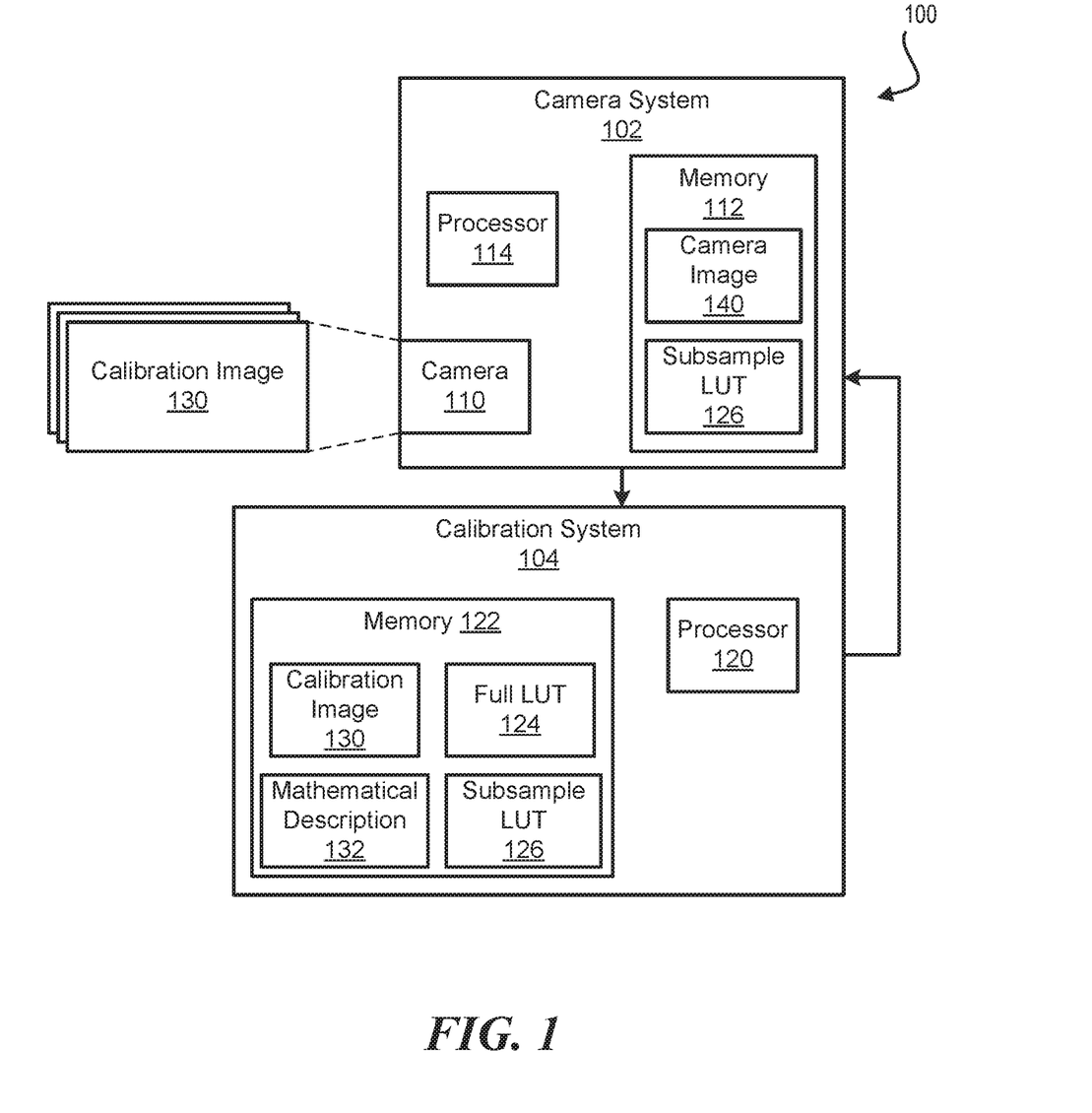
FIG. 1 is a block diagram illustrating a portion of a system for calibrating a camera system in accordance with at least one embodiment.

FIG. 1 is a block diagram illustrating a portion of a system 100 including a camera system 102 and a calibration system 104. Camera system 102 includes a camera 110, a memory 112, and a processor 114. Calibration system 104 includes a processor 120 and a memory 122. In an example, data for calibrating camera 110 may be stored in memory 122. In certain examples, the data may be stored in any suitable manner including, but not limited to, calibration images 130, a mathematical description or model 132 of a pattern on each of the calibration images, a full LUT 124 and a subsampled LUT 126. Memory 112 may store any suitable data for camera system 102 including, but not limited to, subsampled LUT 126 and camera images 140. In an example, system 100 may include additional components without varying from the scope of the disclosure.

In an example, camera system 102 may be part of any suitable system to utilize any type of imagery including still images and video images. For example, camera system 102 may be part of an Advanced Driver Assistance System (ADAS). However, the optical system of camera 110 may introduce geometric distortion that may need to be corrected prior to the image being processed by one or more systems within the ADAS.

Calibration system 104 may calibrate the geometric correction for camera system 102 in any suitable manner including, but not limited to, creating a look-up table (LUT) to generate a corrected image from a distorted image captured by camera 110. In an example, calibration of camera system 102 may be performed at any suitable time including, but not limited to, after assembly of the camera system, such as when the camera system is installed within vehicle.

Prior to adaptive subsampling, a full LUT 124 may be created from multiple camera images 130. In an example, any number of camera images 130 may be utilized, and each of the images may include any type of known pattern to calibrate camera 110 of camera system 102. In an example, processor 120 may create a full LUT 124 based on mapping multiple camera/calibration images 130 to form a single full LUT. For example, processor 120 may calibrate mathematical model or description 132 describing the distortion of the optical system within camera 110 using sample points extracted out of the detected pattern in the scene captured in calibration image 130 by the camera system. In an example, the calibration of mathematical model 132 is based on the dimensions of the pattern in calibration image 130 being known to processor 120. Based on mathematical model 132, processor 120 may generate full look-up table 124. However, as stated above, using the full LUT 124 for the distortion correction may require a lot of bandwidth within camera system 102. In certain examples, full LUT 124 may be stored in memory 122 of calibration system 104.

Calibration system 104 may configure geometric distortion correction for camera system 102 in any suitable manner. For example, calibration system 104 may iteratively down-sample full LUT 124 until an adaptive sub-sampled LUT 126 is created. In an example, processor 120 of calibration system 104 may iteratively down sample different portions of full LUT 124 until the processor determines a proper subsampling for each portion of the full LUT. In an example, the proper subsampling may be a subsampling to correct geometric distortion within a particular portion of full LUT 124 associated with multiple calibration images 130. An adaptive sub-sampled LUT 126 generated by the proper subsampling may reduce bandwidth within camera system 102 based on the smaller adaptive sub-sampled LUT utilized to generate a corrected image from a distorted image.

Figure 2:
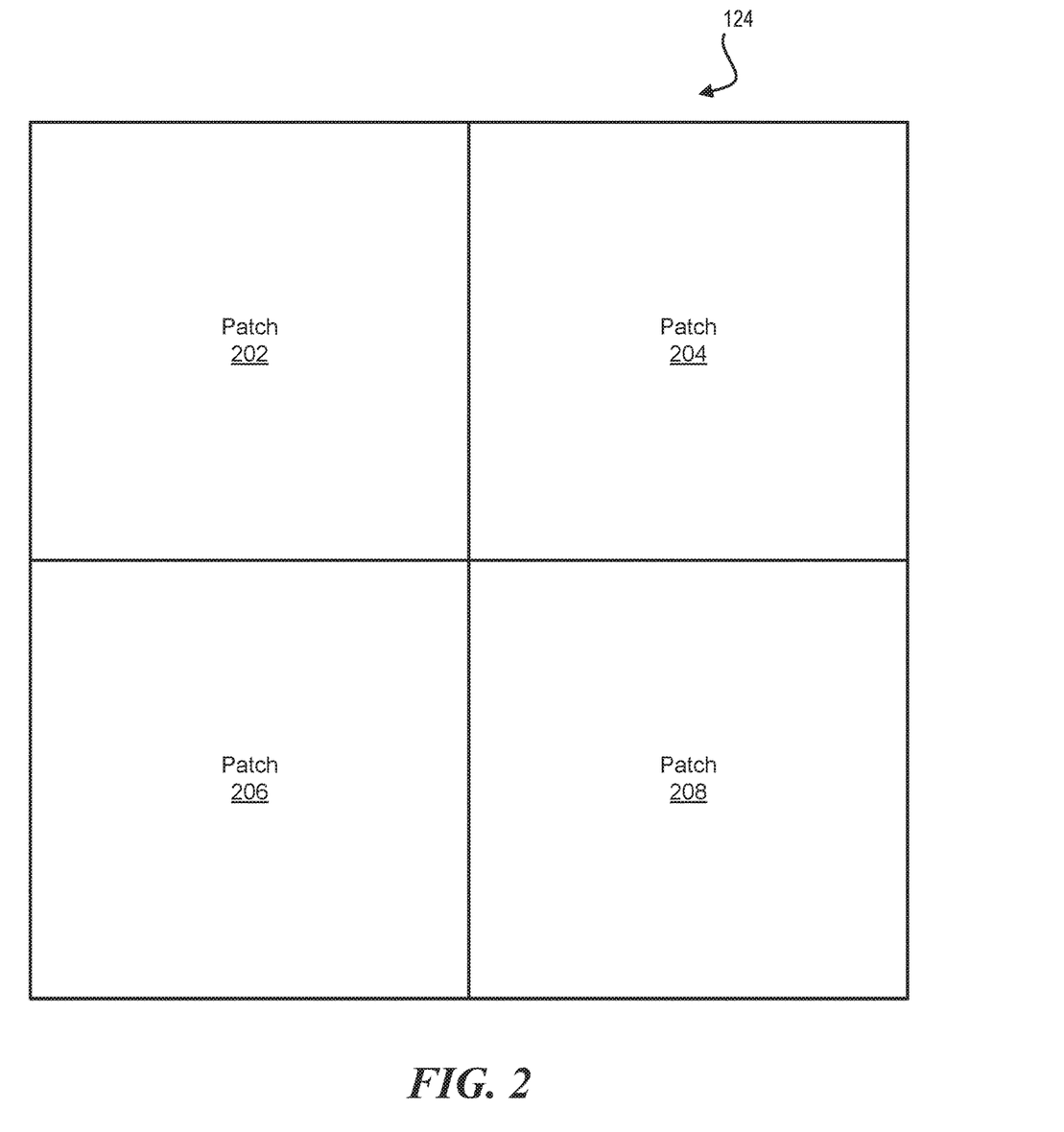
FIG. 2 is a diagram illustrating an image divided into multiple patches in accordance with at least one embodiment.

An exemplary adaptive down-sampling process of geometric correction for camera system 102 will be described with respect to FIGS. 2, 3, 4, 5, and 6. Referring now to FIG. 2, upon full LUT 124 being created, calibration system 104 may divide the full LUT into multiple patches 202, 204, 206, and 208. In an example, full LUT 124 may be divided into any suitable number of patches including, but not limited to, four, six, and eight. For example, full LUT 124 may be divided into four 16×16 patches 202, 204, 206, and 208, such that each of the patches are equal in size.

Processor 120 may subsample the correction data within portions of full LUT 124 associated with each of patches 202, 204, 206, and 208. The subsampling may be based on the size of the patch. For example, a 16×16 patch may correspond to correction data being subsampled by a 1/256 subsampling method. In an example, the number of subsampled positions in subsampled LUT 126 and therefore the amount of data used for the subsampled LUT may be reduced from full LUT 124 based on the subsampling method. For example, if subsampled LUT 126 is created based on a 1/256 subsampling method, the subsampled LUT may require 1/256 of the data size of the full LUT. In this example, subsampled LUT 126 may include data at every sixteen positions both horizontally and vertically as compared to full LUT 124.

In response to creating the subsampling LUT 126, processor 120 may determine a maximum difference inside a patch between the positions of the pixels in full LUT 124 and the positions of the same pixels in the subsampled LUT. In response to the determination of the maximum difference between positions, processor 120 may determine whether the maximum difference is greater than a threshold. In certain examples, the threshold may be a maximum acceptable deviation of the positions of the pixels in the adaptively subsampled look-up table from the positions of the pixels in the full look-up table. If the difference is equal to or less than the threshold, processor 120 may determine that the current subsampling is proper for a particular patch, such as patch 202, and store the subsampling for that portion of correction data in subsampled LUT 126. However, if the maximum difference is greater than the threshold, the amount of down sampling (e.g., the 1/256 subsampling) may be too great, such that unacceptable artifacts may appear in a corrected image.

Figure 3:
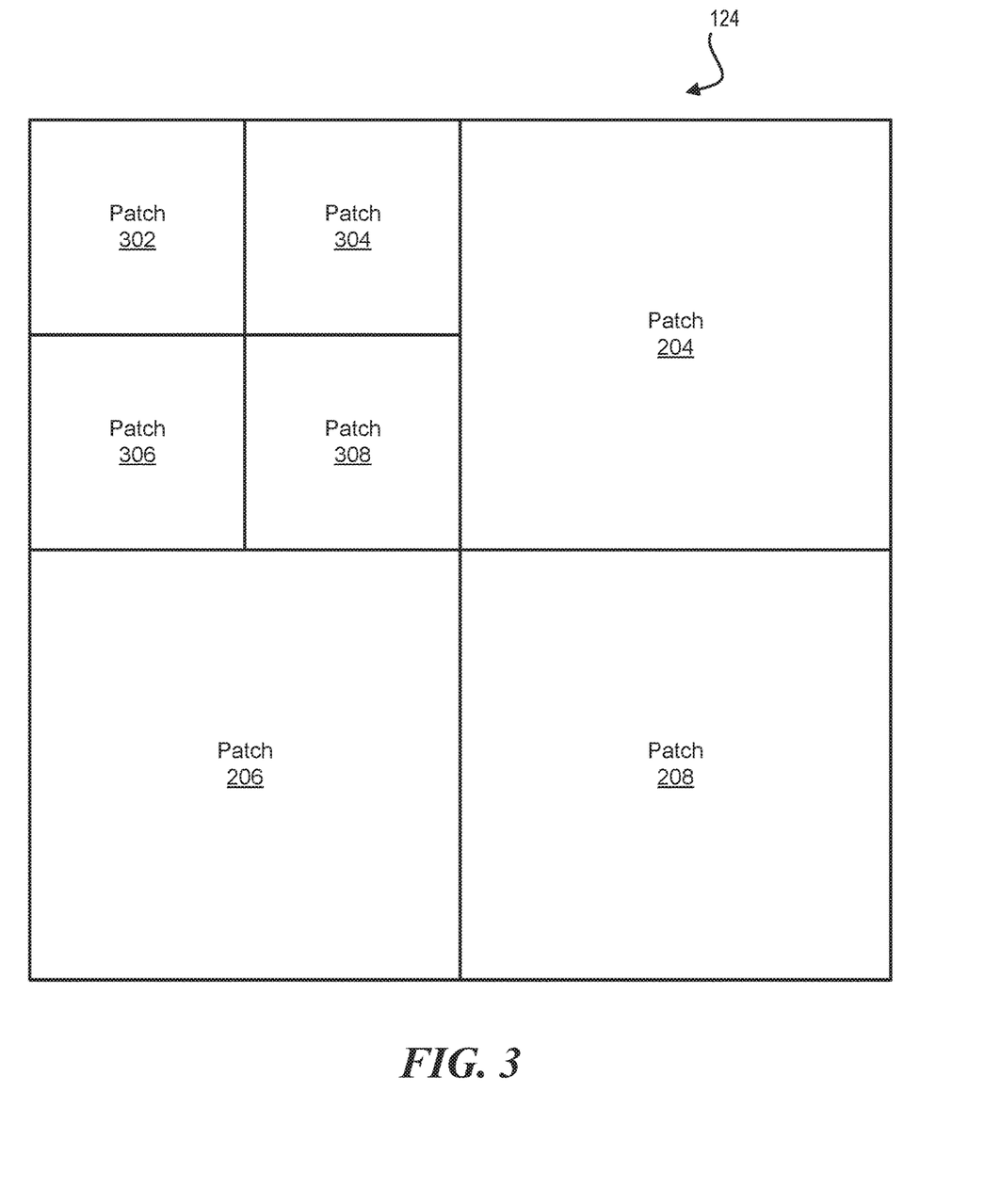
FIG. 3 is a diagram illustrating the image with a first patch divided into multiple sub-patches in accordance with at least one embodiment.

In an example, in response to the difference being greater than the threshold, processor 120 may change the subsampling of the correction data within the portion of full LUT 124 associated with patch 202 in any suitable manner. For example, processor 120 may divide patch 202 into multiple additional patches, such as patches 302, 304, 306, and 308 as shown in FIG. 3. In certain examples, patches 302, 304, 306, and 308 may be substantially equal in size, such as 8×8 patches.

In response to patch 202 being divided into patches 302, 304, 306, and 308, processor 120 may subsample the correction data within the portion of full LUT 124 associated with each of the patches. In an example, an 8×8 patch may correspond to correction data that is subsampled by a 1/64 subsampling method. In response to subsampling the correction data within the portion of full LUT 124 associated with each of patches 302, 304, 306, and 308, processor 120 may create an updated subsampled LUT 126 for pixels in a corrected image associated based on the subsampling. In an example, the new portions of subsampled LUT 126 may include sampled data at every eight positions both horizontally and vertically as compared to full LUT 124.

Figure 4:
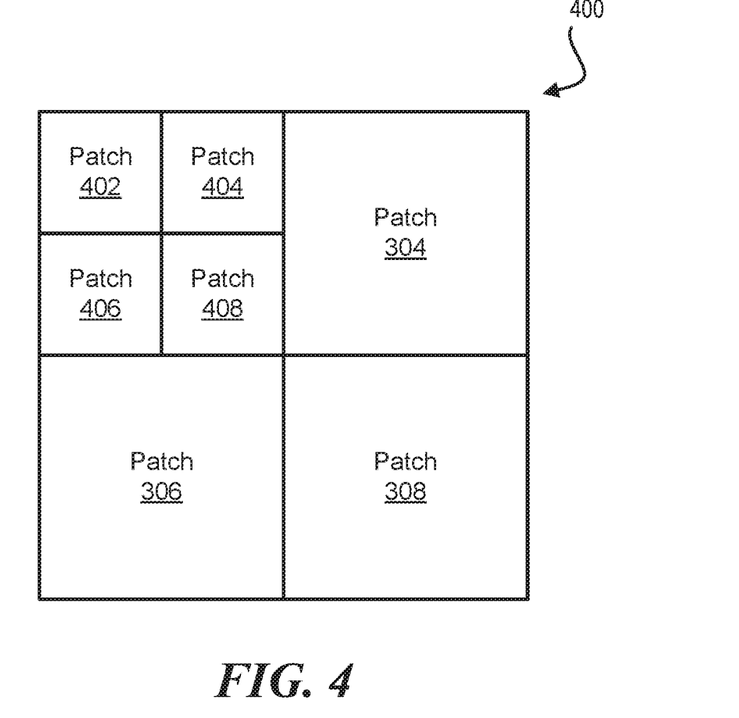
FIG. 4 is a diagram illustrating the image with a first sub-patch divided into multiple additional sub-patches in accordance with at least one embodiment.

Processor 120 may determine a maximum difference between the positions of pixels in full LUT 124 and the positions of the same pixels in subsampled LUT 126 for a particular patch. In response to the determination of the maximum difference between positions, processor 120 may determine whether the maximum difference is greater than the threshold. If the maximum difference is equal to or less than the threshold, processor 120 may determine that the current subsampling is proper for a particular patch, such as patch 302, and store the corresponding subsampling in the portion of subsampled LUT 126 corresponding to the particular patch. However, if the difference is greater than the threshold, the amount of down sampling (e.g., the 1/64 subsampling) may be too great. In an example, in response to the difference being greater than the threshold, processor 120 may divide one of patches 302, 304, 306, and 308, such as patch 302 into multiple additional patches, such as patches 402, 404, 406, and 408 as shown in FIG. 4. In certain examples, patches 402, 404, 406, and 408 may be substantially equal in size, such as 4×4 patches.

In response to patch 302 being divided into patches 402, 404, 406, and 408, processor 120 may subsample the correction data within the portion of full LUT 124 associated with each of the patches. In an example, a 4×4 patch may correspond to correction data that is subsampled by a 1/16 subsampling method. In response to subsampling each of patches 402, 404, 406, and 408, processor 120 may create an updated subsampled LUT 126 for pixels in a corrected image based on the subsampling. In an example, the updated portion of subsampled LUT 126 may include sampled data at every four positions both horizontally and vertically as compared to full LUT 124.

Figure 5:
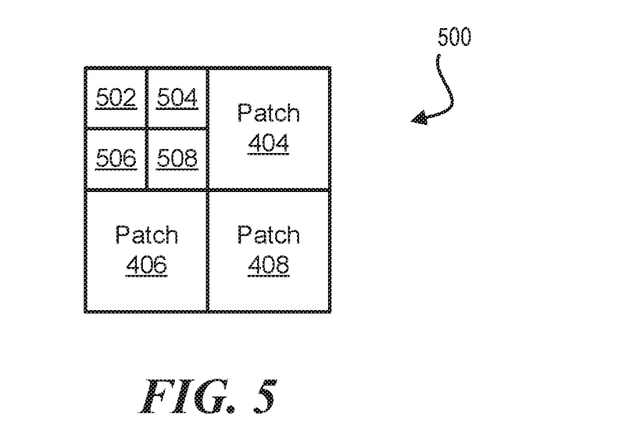
FIG. 5 is a diagram illustrating the image with a second sub-patch divided into multiple additional sub-patches in accordance with at least one embodiment.

In response to creating the updated portion of subsampled LUT 126, processor 120 may determine a maximum difference between the positions of pixels in full LUT 124 and the positions of the same pixels in subsampled LUT 126 for a specific patch. In response to the determination of the maximum difference between positions, processor 120 may determine whether the difference is greater than the threshold. If the difference is equal to or less than the threshold, processor 120 may determine that the current subsampling of the correction data is proper for a particular patch, such as patch 402, and store the corresponding subsampling in a portion of subsampled LUT 126 associated with the particular patch. However, if the maximum difference is greater than the threshold, the amount of down sampling (e.g., the 1/16 subsampling) may be too great. In an example, in response to the difference being greater than the threshold, processor 120 may divide one of patches 402, 404, 406, and 408, such as patch 402 into multiple additional patches, such as patches 502, 504, 506, and 508 as shown in FIG. 5. In certain examples, patches 502, 504, 506, and 508 may be substantially equal in size, such as 2×2 patches.

In response to patch 402 being divided into patches 502, 504, 506, and 508, processor 120 may subsample the correction data within the portion of full LUT 124 associated with each of the patches. In an example, a 2×2 patch may correspond to correction data being subsampled by a 1/4 subsampling method. In response to subsampling each of patches 502, 504, 506, and 508, processor 120 may create an updated portion subsampled LUT 126 for pixels in a corrected image based on the subsampling. In an example, the updated portion of subsampled LUT 126 may include sampled data at every two positions both horizontally and vertically.

Processor 120 may determine a maximum difference between the positions of pixels in full LUT 124 and the positions of the same pixels in subsampled LUT 126 for a specific patch. In response to the determination of the difference between positions, processor 120 may determine whether the difference is greater than the threshold. If the difference is equal to or less than the threshold, processor 120 may determine that the current subsampling is proper for a particular patch, such as patch 502, and store the corresponding subsampling in a portion of subsampled LUT 126 associated with the particular patch. In an example, subsampled LUT 126 may include subsampled distortion correction information, and metadata information that may be used by the distortion correction block to select a correct patch size.

Upon processor 120 determining a proper subsampling for a particular patch or portion of full LUT 124, the processor may repeat the operations described above for every patch within the full LUT. Thus, processor 120 may create a different subsampling within different portions of subsampled LUT 124 associated each patch or sub-patch of full LUT 124, and provide the adaptively subsampled LUT to camera system 102 for storage within memory 112.

Figure 6:
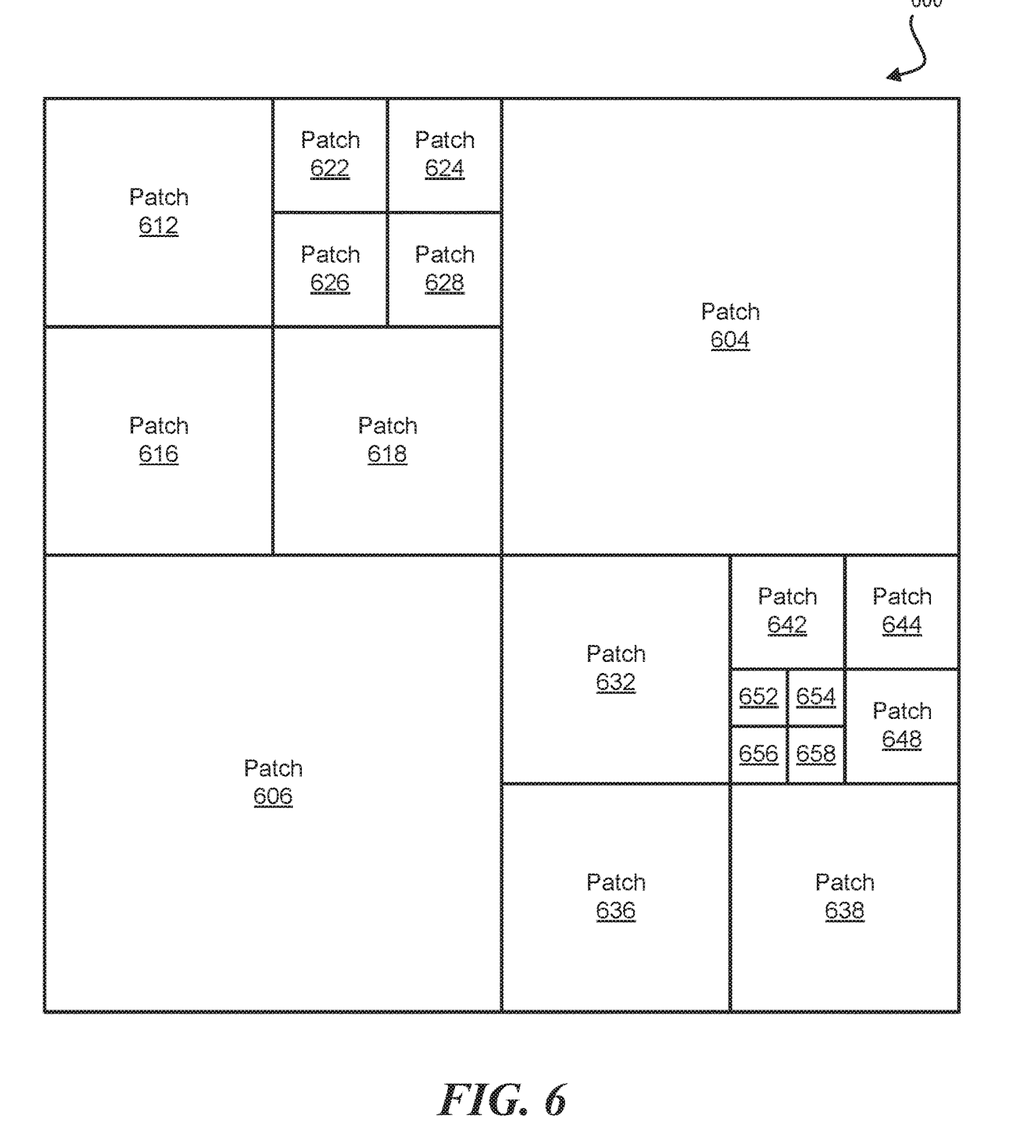
FIG. 6 is a diagram illustrating the image with varying sizes of sub-patches based on determined subsampling of a full look-up table of the test image in accordance with at least one embodiment.

FIG. 6 is a diagram illustrating an exemplary full LUT 600 with varying sub-patch sizes based on determined subsampling of the full LUT in accordance with at least one embodiment. Full LUT 600 may be divided in multiple patches and sub-patches including patches 604, 606, 612, 616, 618, 622, 624, 626, 628, 632, 636, 638, 642, 644, 648, 652, 654, 656, and 658. In an example, the full LUT 124, of FIG. 1, may be adaptively subsampled at different portions of the full LUT corresponding to different patches or sub-patches of the full LUT. In an example, full LUT 600 may illustrate patches of different sizes that correspond to different levels of subsampling of correction data within a subsampled LUT, such as subsampled LUT 126 of FIG. 1. As shown and described herein, the patches have square, such as 64×64, 32×32, 16×16, or like. However, the patches may be any suitable size including, but not limited to, 32×64, 16×32, 8×16, or the like without varying from the scope of the disclosure.

Thus, an exemplary subsampled LUT, such as subsampled LUT 126 of FIG. 1, created from the full LUT 600 may include adaptive subsampling of correction data, such as a displacement vector, from a full LUT, such as full LUT 124 of FIG. 1. In an example, the adaptive subsampled LUT 126 may be used to generate a quality corrected image while reducing bandwidth within the camera system. The reduced bandwidth may result from less correction data being store within the subsampled LUT based on the subsampling.

Figure 7:
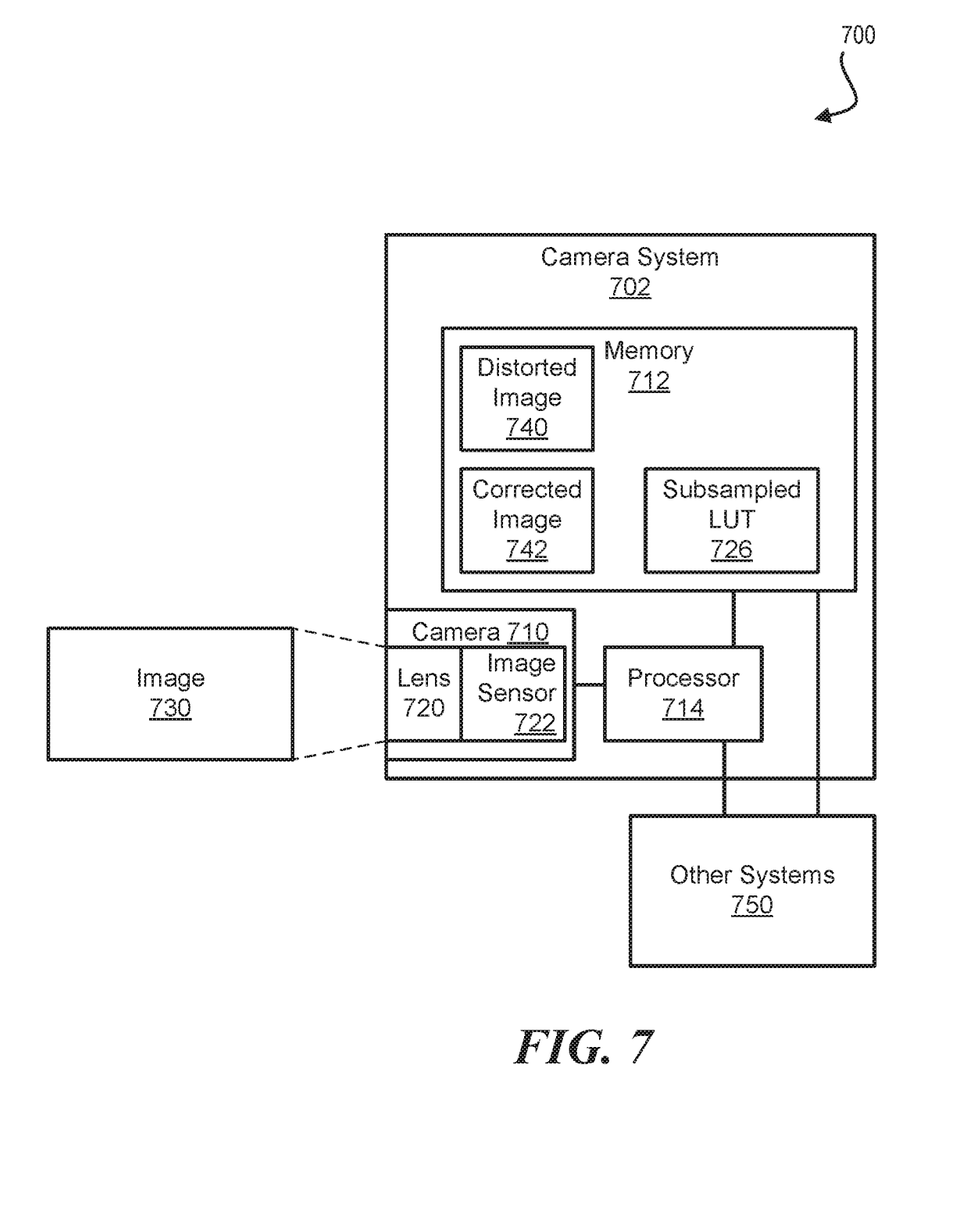
FIG. 7 is a diagram illustrating a portion of a system for generating a corrected image of an image captured by a camera system and corrected based on a varying adaptively subsampled look-up table in accordance with at least one embodiment.

FIG. 7 is a diagram illustrating a portion of a system 700 for rendering a corrected image of an image captured by a camera system 702 in accordance with at least one embodiment. Camera system 702 includes a camera 710, a memory 712, and a processor 714. Camera 710 includes a lens 720 and an image sensor 722. In an example, system 700 may include additional components, such as other systems 750, without varying from the scope of the disclosure.

During calibration of camera system 702, subsampled LUT 726 may be provided to camera system 702 from any suitable device including, but not limited to, calibration system 104 of FIG. 1. In an example, subsampled LUT 726 may be permanently stored in memory 712. Subsampled LUT 726 may include adaptive subsampling within different portions of the subsampled LUT. In an example, subsampled LUT 726 may be created in any suitable manner including, but not limited to, the manner described with respect to FIGS. 2-6 above.

During operation of camera system 702, processor 714 may utilize subsampled LUT 726 stored within memory 712 to provide geometric correction of images captured by camera 710. For example, camera 710 may capture an image that is a distorted image 740 and the image may be distorted based on the optical system of camera 710. Thus, camera system 702 may utilize subsampled LUT 726 stored within memory 712 to generate a corrected image 742 from distorted image 740 captured by camera 710. In an example, processor 714 may correct distorted captured image 740 based on correction data within subsampled LUT 726. In response to generating corrected image 742, processor 714 may provide corrected image 742 for further processing steps. In an example, the further processing steps by be implemented by processor 714 or other systems 750. The further processing steps may include, but are not limited to, an analysis function, such as a classical compute vision or neural network based approaches, to lead other direct actions. In certain examples, the other direct actions may include, but are not limited to, braking, steering, or warnings (e.g. vibrating steering wheel, acoustic warning). In an example, one further processing step may include providing corrected image 742 to a display for viewing by an individual associated with camera system 702.

Figure 8:
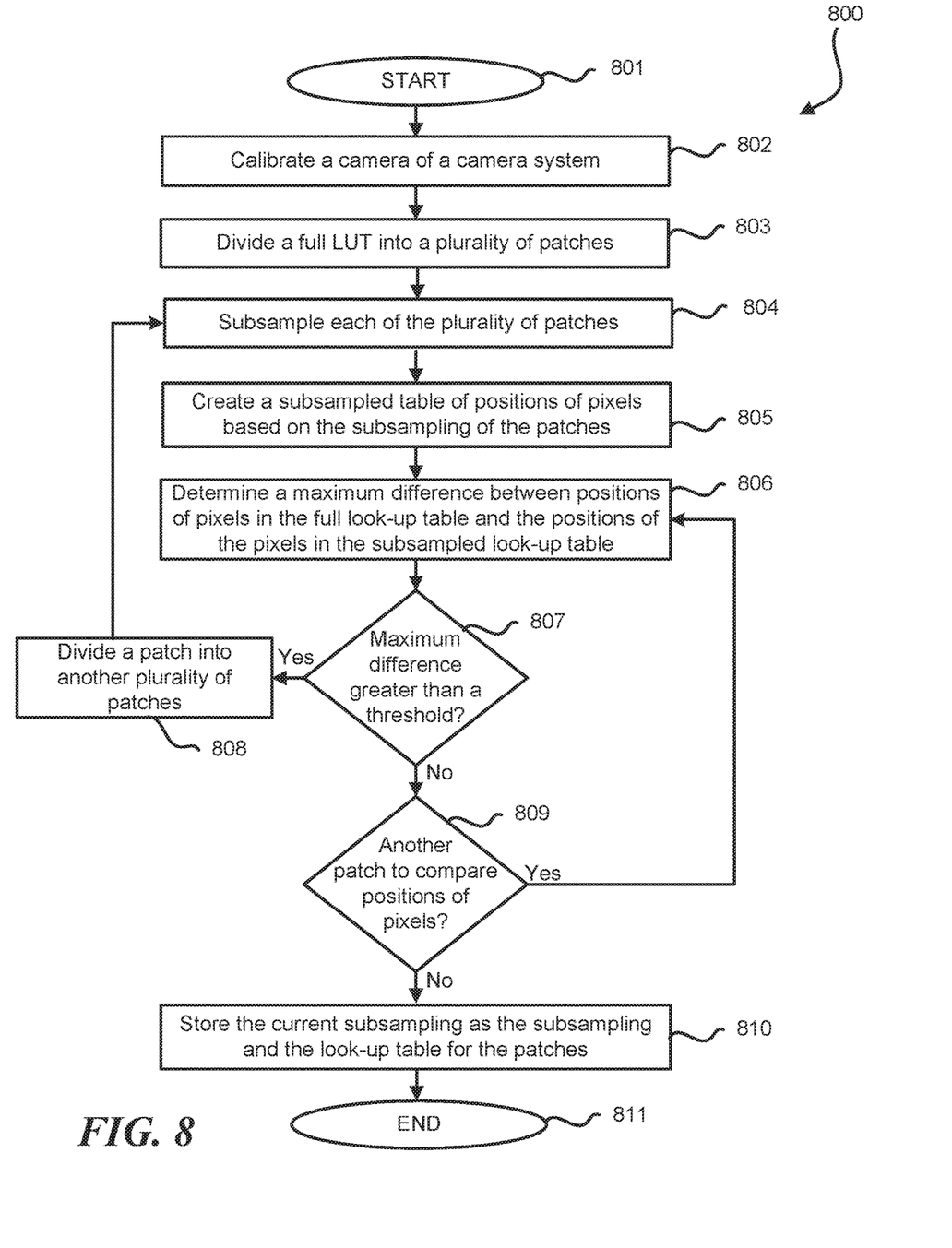
FIG. 8 is a flow diagram illustrating a method for creating an adaptively sub-sampled look-up table to configure a camera system according to at least one embodiment of the disclosure.

FIG. 8 is a flow diagram illustrating a method for creating a look-up table to configure a camera system according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 800 of FIG. 8 may be executed to reduce geometric distortion in an image caused by an optical system of a camera while reducing bandwidth between processing circuitry and a memory of the optical system. In an example, method 800 may be an offline process at the end of a manufacturing line for a vehicle including a camera system.

Method 800 begins at block 801 and continues to block 802. At block 802, a camera of the camera system is calibrated. In an example, the camera may be calibrated based on multiple calibration images, and a processor of the calibration performing one or more operations. Each image may contain a particular known pattern, such as a checkerboard, and the images may be different from one another but the pattern for each image is known. In an example, the processor may calibrate a mathematical model describing the distortion of the optical system within the camera system using sample points extracted out of the detected pattern in the scene captured by the camera system. In an example, the calibration of the mathematical model is based on the dimensions of the pattern in the image being known to the processor. Based on the mathematical model, the processor may generate a full LUT. In an example, the full LUT may be a direct mapping of each pixel in a corrected image to a source position. In certain examples, the full LUT may be stored in a memory of a calibration system.

At block 803, the calibration data within the full LUT is divided into a plurality of patches. In an example, the calibration data may be divided into any suitable number of patches. For example, if the camera is a 2.1 megapixel camera, such that the resolution is 1920*1080 the calibration data may be divided into 30×17 patches each with a size of 64×64 pixels.

At block 804, each of the patches is subsampled. The subsampling may be based on the size of the patch. Thus, a 16×16 patch may be subsampled by a 1/256 subsampling method, an 8×8 patch may be subsampled by a ⅟64 subsampling method, a 4×4 patch may be subsampled by a ⅟16 subsampling method, and 2×2 patch may be subsampled by a ¼ subsampling method.

At block 805, a subsampled look-up table (LUT) of positions of pixels is created based on the subsampling. In an example, the number of subsampled positions in the LUT and therefore the amount of data used for the LUT may be reduced from the full LUT based on the subsampling method. For example, a LUT created based on a 1/256 subsampling method may require 1/256 of the data size of the full LUT.

At block 806, a maximum difference or deviation between positions of pixels in the full LUT and positions of the same pixels in the subsampled LUT is determined. In an example, the difference is a comparison between an ideal pixel position and an interpolated position from the subsampled table for the entire patch currently being considered.

At block 807, a determination is made whether the maximum difference is greater than a threshold. In an example, the threshold may be a maximum acceptable deviation of the positions of the pixels in the adaptively subsampled look-up table from the positions of the pixels in the full look-up table. In certain examples, if the difference is greater than the threshold, the amount of down sampling may be too great, such that unacceptable artifacts may appear in a corrected image.

If the difference is greater than the threshold, a patch of the test image is divided into another plurality of patches at block 808, and the method continues as stated above at block 804.

If the difference is less than or equal to the threshold, a determination is made whether another patch within the full LUT has been subsampled, such that positions of pixels in the subsampled LUT need to be compared to positions of corresponding pixels in the full LUT at block 809. If another patch of the full LUT remains, the flow continues as stated above at 806. If no other patch of the full LUT remains, the adaptive subsampled LUT for the current subsampling is stored at block 810. In an example, the subsampled LUT includes subsampled distortion correction information, and metadata information that may be used by the distortion correction block to select a correct patch size. Method 800 ends at block 811.

Figure 9:
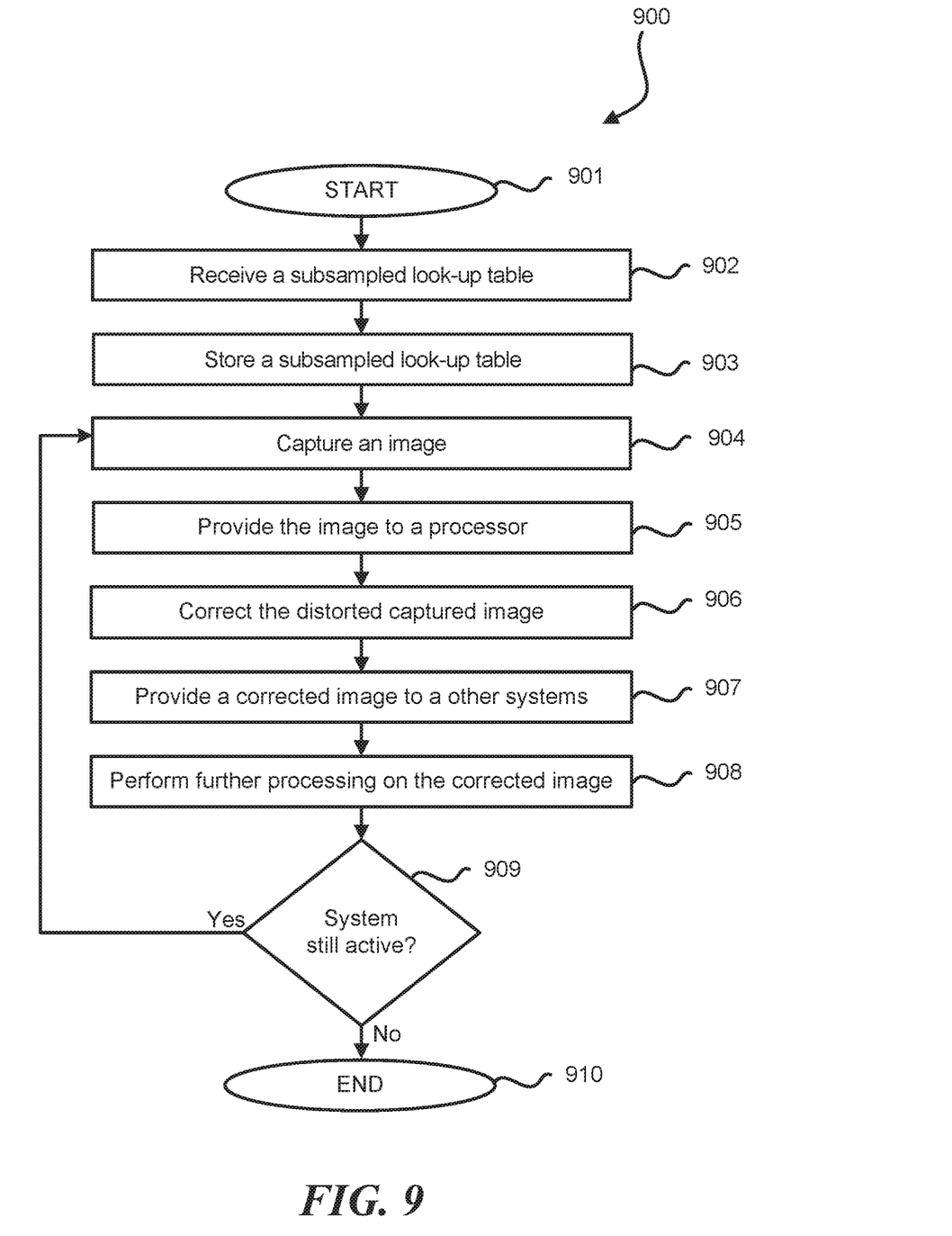
FIG. 9 is a flow diagram illustrating a method for creating a corrected image of a captured image based on a look-up table with variable subsampling within the look-up table according to at least one embodiment of the disclosure.

FIG. 9 is a flow diagram illustrating a method for creating a corrected image of a captured image based on a look-up table with variable subsampling within the look-up table according to at least one embodiment of the disclosure. It will be readily appreciated that not every method step set forth in this flow diagram is always necessary, and that certain steps of the methods can be combined, performed simultaneously, in a different order, or perhaps omitted, without varying from the scope of the disclosure. In an embodiment, method 900 of FIG. 9 may be executed to reduce geometric distortion in an image processed by an optical system of a camera while reducing bandwidth between processing circuitry and a memory of the camera system as compared to a full look-up table.

Method 900 begins at block 901 and continues to block 902. At block 902, an adaptively subsampled look-up table is received from a calibration system. The adaptively subsampled look-up table includes adaptive subsampling within different portions of the adaptively subsampled look-up table.

At block 903, the adaptively subsampled look-up table is stored in the memory. For example, the adaptively subsampled look-up table may be stored during a calibration of the camera system.

At block 904, an image is captured. For example, the image may be captured by a camera of the camera system. The captured image may be distorted based on varying distortions within an optical system.

At block 905, the captured image is provided to a processor of the camera system. At block 906, the distorted captured image is corrected based on the adaptively subsampled look-up table. The processor may utilize the adaptively sub-sampled correction data within the adaptively subsampled look-up table to create the corrected image.

At block 907, the corrected image is provided to other systems. In response to receiving the corrected image at the other systems, the corrected image is further processed at block 908. The further processing may include, but are not limited to, an analysis function, such as a classical compute vision or neural network based processing, to lead other direct actions. In certain examples, the other direct actions may include, but are not limited to, braking, steering, or warnings (e.g. vibrating steering wheel, acoustic warning). In an example, one further processing step may include providing corrected image to a display for viewing by an individual associated with camera system. At block 909, a determination is made whether the system is still active. If so, the flow continues as stated above at block 904, otherwise method 900 ends at block 910.

In accordance with at least one embodiment, a camera system is disclosed. The camera system includes a memory device to store an adaptively subsampled look-up table. In an embodiment, the adaptively subsampled look-up table includes different levels of subsampling within different portions of the adaptively subsampled look-up table. The camera system further includes a camera to capture an image. In an embodiment, the captured image is distorted based on varying distortions within an optical system of the camera. The camera system also includes a processor to communicate with the memory device and with the camera. The processor is configured to receive the captured image from the camera. The processor is further configured to correct the distorted captured image based on the adaptively subsampled look-up table to create a correct image, to provide the corrected image, and to execute an operation based on the corrected image.

In an embodiment, the camera system further includes a display device to communicate with the processor. The display device to receive the corrected image from the processor, and to display the corrected image.

In an embodiment, the varying levels of subsampling within different portions of the adaptively subsampled look-up table are based on the varying distortions within the optical system of the camera. In an embodiment, the adaptively subsampled look-up table includes data to indicate a level of subsampling within different portions of the adaptively subsampled look-up table. In an embodiment, the processor is further configured to receive the adaptively subsampled look-up table from a calibration system, and to store the adaptively subsampled look-up table in the memory device during a calibration of the camera system.

In an embodiment, the adaptively subsampled look-up table is created by an offline calibration system. In an embodiment, the operation is a safety function. In an embodiment, the safety function is selected from a group including automatic braking, automatic steering, and a warning.

In accordance with at least one embodiment, method is disclosed. The method includes storing, in a memory device of a camera system, a adaptively subsampled look-up table. In an embodiment, the adaptively subsampled look-up includes adaptive subsampling within different portions of the adaptively subsampled look-up table. The method further includes capturing, by a camera of the camera system, an image. In an embodiment, the captured image is distorted based on varying distortions within an optical system of the camera. The method also includes receiving, by a processor of the camera system, the captured image from the camera. The method further includes correcting the distorted captured image based on the adaptively subsampled look-up table to create a correct image. The method also includes executing an operation based on the corrected image.

In an embodiment, the method further includes displaying, by a display device of the camera system, the corrected image. In an embodiment, the varying levels of subsampling within different portions of the adaptively subsampled look-up table are based on the varying distortions within the optical system of the camera. In an embodiment, the adaptively subsampled look-up table includes data to indicate a level of subsampling within different portions of the adaptively subsampled look-up table.

In an embodiment, the method further includes receiving the adaptively subsampled look-up table from a calibration system. In this embodiment, the method also includes storing the adaptively subsampled look-up table in the memory device during a calibration of the camera system.

In this embodiment, the adaptively subsampled look-up table is created during an offline process by the calibration system. In an embodiment, the operation is a safety function. In this embodiment, the safety function is selected from a group including automatic braking, automatic steering, and a warning.

In accordance with at least one embodiment, a calibration system is disclosed. The calibration system includes a memory device to store a full look-up table. The calibration system further includes a processor to communicate with the memory device. The processor is configured to iteratively divide the full look-up table into a plurality of patches, subsample the each of the plurality of patches at a subsampling, and create a adaptively subsampled look-up table based on the subsampling. The processor is further configured to determine, during each iteration, whether the adaptively subsampled look-up table creates a corrected image with a predetermined quality level. In response to the corrected image not having the predetermined quality level, the processor is also configured to: sub-divide a first patch of the plurality of patches in a plurality of sub-patches; subsample the each of the plurality of sub-patches at an adaptive subsampling, and update the adaptively subsampled look-up table based on the subsampling; and determine whether the adaptively subsampled look-up table creates the corrected image with the predetermined quality level. In response to the adaptively subsampled look-up table creating the corrected image with the predetermined quality level, the processor is further configured to store the subsampling for a portion of the adaptively subsampled look-up table. In response to all portions of the adaptively subsampled look-up table being assigned a particular subsampling, the processor is also configured to store the adaptively subsampled look-up table in a memory device of the camera system of the vehicle.

In an embodiment, the adaptively subsampled look-up includes different levels of subsampling within different portions of the adaptively subsampled look-up table. In an embodiment, during the determination of the predetermined quality level, the processor is further configured to determine whether a maximum difference between positions of pixels in the full look-up table and positions of pixels in the adaptively subsampled look-up table is greater than a threshold value. In an embodiment, the threshold value is a maximum acceptable deviation of the positions of the pixels in the adaptively subsampled look-up table from the positions of the pixels in the full look-up table.

The concepts of the present disclosure have been described above with reference to specific embodiments. However, one of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A camera system comprising:
   a memory device to store a predetermined adaptively subsampled calibration look-up table, wherein the predetermined adaptively subsampled calibration look-up table includes different levels of subsampling within different portions of the predetermined adaptively subsampled calibration look-up table;
   a camera to capture an image, wherein the captured image is distorted based on varying distortions within an optical system of the camera, wherein the predetermined adaptively subsampled calibration look-up table is configured to compensate for the varying distortions within the optical system of the camera such that a corrected image generated based on the predetermined adaptively subsampled calibration look-up table and the captured image satisfies a threshold image quality criterion; and
   a processor to communicate with the memory device and with the camera, the processor configured to:
   receive the captured image from the camera;
   correct the distorted captured image based on the predetermined adaptively subsampled calibration look-up table to obtain a corrected image; and
   execute an operation based on the corrected image.

2. The camera system of claim 1, further comprising a display device to communicate with the processor, the display device to:
   receive the corrected image from the processor; and
   display the corrected image.

3. The camera system of claim 1, wherein the different levels of subsampling within different portions of the predetermined adaptively subsampled calibration look-up table are based on the varying distortions within the optical system of the camera.

4. The camera system of claim 1 wherein the predetermined adaptively subsampled calibration look-up table includes data indicative of a level of subsampling within different portions of the predetermined adaptively subsampled calibration look-up table.

5. The camera system of claim 1 wherein the processor further to receive the predetermined adaptively subsampled calibration look-up table from a calibration system, and to store the predetermined adaptively subsampled look-up table in the memory device during a calibration of the camera system.

6. The camera system of claim 1 wherein the predetermined adaptively subsampled calibration look-up table is created by an offline calibration system.

7. The camera system of claim 1 wherein the operation is a safety function.

8. The camera system of claim 7 wherein the safety function is selected from a group including automatic braking, automatic steering, and a warning.

9. A method comprising:
   storing, in a memory device of a camera system, a predetermined adaptively subsampled calibration look-up table, wherein the predetermined adaptively subsampled calibration look-up table includes adaptive subsampling within different portions of the predetermined adaptively subsampled calibration look-up table;
   capturing, by a camera of the camera system, an image, wherein the captured image is distorted based on varying distortions within an optical system of the camera, wherein the predetermined adaptively subsampled calibration look-up table is configured to compensate for the varying distortions within the optical system of the camera such that a corrected image generated based on the predetermined adaptively subsampled calibration look-up table and the captured image satisfies a threshold image quality criterion;

receiving, by a processor of the camera system, the captured image from the camera;

correcting the distorted captured image based on the predetermined adaptively subsampled calibration look-up table to create a corrected image; and executing an operation based on the corrected image.

10. The method of claim 9 further comprising:

displaying, by a display device of the camera system, the corrected image.

11. The method of claim 9 wherein the adaptive levels of subsampling within different portions of the predetermined adaptively subsampled calibration look-up table are based on the varying distortions within the optical system of the camera.

12. The method of claim 9 wherein the predetermined adaptively subsampled calibration look-up table includes data indicative of a level of subsampling within different portions of the predetermined adaptively subsampled calibration look-up table.

13. The method of claim 9 further comprising:

receiving the predetermined adaptively subsampled calibration look-up table from a calibration system; and storing the predetermined adaptively subsampled calibration look-up table in the memory device during a calibration of the camera system.

14. The method of claim 9 wherein the predetermined adaptively subsampled calibration look-up table is created during an offline process by the calibration system.

15. The method of claim 9 wherein the operation is a safety function.

16. The method of claim 15 wherein the safety function is selected from a group including automatic braking, automatic steering, and a warning.

17. A calibration system comprising:

a memory device to store a full look-up table; and a processor to communicate with the memory device, the processor configured to:

iteratively divide the full look-up table into a plurality of patches, subsample the each of the plurality of patches at a selected one of multiple levels of subsampling, and create an adaptively subsampled look-up table based on the selected level of subsampling;

determine, during each iteration, whether the adaptively subsampled look-up table creates a corrected image with a predetermined quality level;

in response to the corrected image not having the predetermined quality level to:

sub-divide a first patch of the plurality of patches in a plurality of sub-patches;

subsample the each of the plurality of sub-patches at a next level of subsampling, and update the adaptively subsampled look-up table based on the next level of subsampling; and determine whether the adaptively subsampled look-up table creates the corrected image with the predetermined quality level;

in response to the adaptively subsampled look-up table creating the corrected image with the predetermined quality level, to store the corresponding subsampling level for each corresponding portion of the adaptively subsampled look-up table; and in response to all portions of the adaptively subsampled look-up table being assigned a particular subsampling, to store the adaptively subsampled look-up table in a memory device of the camera system of the vehicle.

18. The calibration system of claim 17, wherein the adaptively subsampled look-up table includes different levels of subsampling within different portions of the adaptively subsampled look-up table.

19. The calibration system of claim 17 wherein the determination of the predetermined quality level, the processor further to determine whether a maximum difference between positions of pixels in the full look-up table and positions of pixels in the adaptively subsampled look-up table is greater than a threshold value.

20. The calibration system of claim 19 wherein the threshold value is a maximum acceptable deviation of the positions of the pixels in the adaptively subsampled look-up table from the positions of the pixels in the full look-up table.

* * * * *